(12) United States Patent
    Cooper

(10) Patent No.:  US 12,636,689 B2
(45) Date of Patent:      May 26, 2026

(54) AUTOMATED FLUID INJECTION SYSTEM

(71) Applicant: Cascade Drilling, L.P., Bothell, WA (US)

(72) Inventor: Eliot Cooper, Denver, CO (US)

(73) Assignee: CASCADE DRILLING, L.P., Bothell, WA (US)

( * ) Notice: Subject to any disclaimer, the term of this patent is extended or adjusted under 35 U.S.C. 154(b) by 77 days.

(21) Appl. No.: 17/814,793

(22) Filed: Jul. 25, 2022

(65) Prior Publication Data

US 2024/0024935 A1      Jan. 25, 2024

Related U.S. Application Data

(60) Provisional application No. 63/225,071, filed on Jul. 23, 2021.

(51) Int. Cl.
    *B09C 1/00*          (2006.01)
    *B09C 1/08*          (2006.01)
(52) U.S. Cl.
    CPC ............... *B09C 1/002* (2013.01); *B09C 1/08* (2013.01); *B09C 2101/00* (2013.01)

(58) Field of Classification Search
    CPC ....... B09C 1/08; B09C 1/002; B09C 2101/00; E21B 37/06
    See application file for complete search history.

(56) References Cited

U.S. PATENT DOCUMENTS

| | | | | |
|---|---|---|---|---|
| 4,917,304 A | * | 4/1990 | Mazzei ................ | A01C 23/042 |
| | | | | 239/69 |
| 10,655,435 B2 | * | 5/2020 | Oehring ................ | E21B 43/26 |
| 2003/0150800 A1 | * | 8/2003 | Salanitro ................ | B09C 1/002 |
| | | | | 210/610 |
| 2004/0168811 A1 | * | 9/2004 | Shaw ...................... | E21B 41/02 |
| | | | | 166/368 |
| 2019/0291153 A1 | * | 9/2019 | Vandenbruwane ....... | E02D 5/66 |
| 2019/0324008 A1 | * | 10/2019 | Kiyotomo ................ | B09C 1/08 |
| 2021/0230988 A1 | * | 7/2021 | Ingebrand ............... | F04B 17/03 |
| 2023/0014538 A1 | * | 1/2023 | Gregg .................... | C02F 3/342 |

* cited by examiner

*Primary Examiner* — Carib A Oquendo
(74) *Attorney, Agent, or Firm* — Kyle Straughan; Holland & Knight LLP

(57) ABSTRACT

This invention describes systems, devices, and methods for injecting environmental remediation amendments into target sites while reducing or eliminating the risk of adverse results.

20 Claims, 11 Drawing Sheets

AUTOMATED FLUID INJECTION SYSTEM

PRIORITY CLAIM

This application claims priority to and/or the benefit of U.S. provisional patent application Ser. No. 63/225,071 filed Jul. 23, 2021. The foregoing application is incorporated by reference in its entirety as if fully set forth herein.

FIELD OF THE INVENTION

This invention relates generally to systems, devices, and methods for the controlled injection of fluid substances into target sites to prevent adverse results.

BACKGROUND OF THE INVENTION

The field of environmental remediation faces a variety of challenges including, but not limited to, the complexity of the contaminants, issues related to the location of areas of contamination, and the quality of the areas of contamination. In some situations, the areas that are contaminated may have specific properties that result in difficulty when attempting to inject fluid amendments to the contaminated areas at target sites. For example, there may be a high risk of adverse results such as fracturing the site or the surrounding area which could result in the remediation fluids failing to make adequate contact with the contaminant, pushing the contaminant to the surface or into other sites, causing surface fracturing of the site or surrounding area, or causing sinkholes or similar environmental hazards or damage. Many of these adverse results are directly related to the injection pressure and injection flow rate of the fluids being injected into the target site. Typically, these two factors are controlled by an operator who is able to adjust the injection pressure and flow rate, typically using manually operated valves or controls. Frequently these operators have minimal access to data regarding the status of the site and surrounding area. Furthermore, historically the tools through which these operators can modulate the injection pressure and flow are relatively crude, relying on on/off valves and other equipment that is less capable of making minute changes. Combined with the issue of limited data, this is frequent the cause of sub-optimal remediation results and/or the adverse effects described herein.

The fluid remediation of aquifers and other sites faces a number of additional challenges, compounding with the foregoing; among them is the challenge of avoiding fracturing and short circuiting when incompressible, or relatively low compressibility, fluids are injected into. the area and the nature of mass and volume requires the fluids attempt to spread from the infection point. In such cases, as the laws of physics require, the fluids and treatment area must be displaced, sometimes simultaneously. When not carefully monitored, excess or insufficient injection pressure and/or flow can lead to results such as, but not limited to, fracturing, resulting in the remediation fluid or contaminant being pushed to the surface, or can result in displacement or structural failure of the remediation site as described above, Furthermore, as described previously, these issues can. result in the remediation fluid not making adequate contact with the contaminant and thus undermining the remediation efforts or, in some cases, resulting in the remediation fluid becoming another form of contaminant.

The challenges above are caused, at least in part, by several flaws with the state of the art as described herein, including, but not limited to, the lack of information that a human operator possesses in most scenarios and relative inability to make small changes to injection pressure and flow. Thus, the risk of adverse results is high and the human operator must react to them once visible signs become present. The relatively limited number of ways the human operator can .respond to adverse results, the limitations of human ability to incorporate data moment to moment and make determinations thereupon, and the limited ability of a human operator to react with the speed necessary to prevent certain adverse results all contribute to the risk of the adverse events described herein. Even if the human operator is able to react in time, in many cases failure of remediation of contaminants can be traced back to lack of effective distribution of the remediation fluids due to issues associated with the manual operation injection procedures that cannot consistently adhere to injection design specifications.

At present, for many chemical contaminants, including, but not limited to mineral oil components, petroleum hydrocarbons, methyl Cert-butyl ether, benzene, toluene, ethylbenzene, xylene, chlorinated aliphatic hydrocarbons, polyaromatic hydrocarbons, polychlorinated biphenyls (PCBs), heavy metals, acids and bases, PFOS, PEAS and PFOA, one of the most effective methods of treatment is through the injection of remediation chemicals into the contaminated area through one or more injection points. As described in the foregoing paragraphs, this approach however has many risks and challenges, which the disclosed invention is designed to mitigate, remedy, and/or prevent.

BRIEF SUMMARY

This invention relates generally to systems, devices, and methods for the injection of fluids into target sites and reducing the risk of adverse results including, but not limited to, fracturing or short circuiting. Specific details of certain embodiments of the invention are set forth in the following description and in the figures to provide a thorough understanding of such embodiments. The present invention may have additional embodiments, may be practiced without one or more of the details described for any particular described embodiment, or may have any detail described for one particular embodiment practiced with any other detail described for another embodiment.

BRIEF DESCRIPTION OF THE DRAWINGS

Embodiments of the present invention are described in detail below with reference to the following drawings.

DETAILED DESCRIPTION

Figure 1:
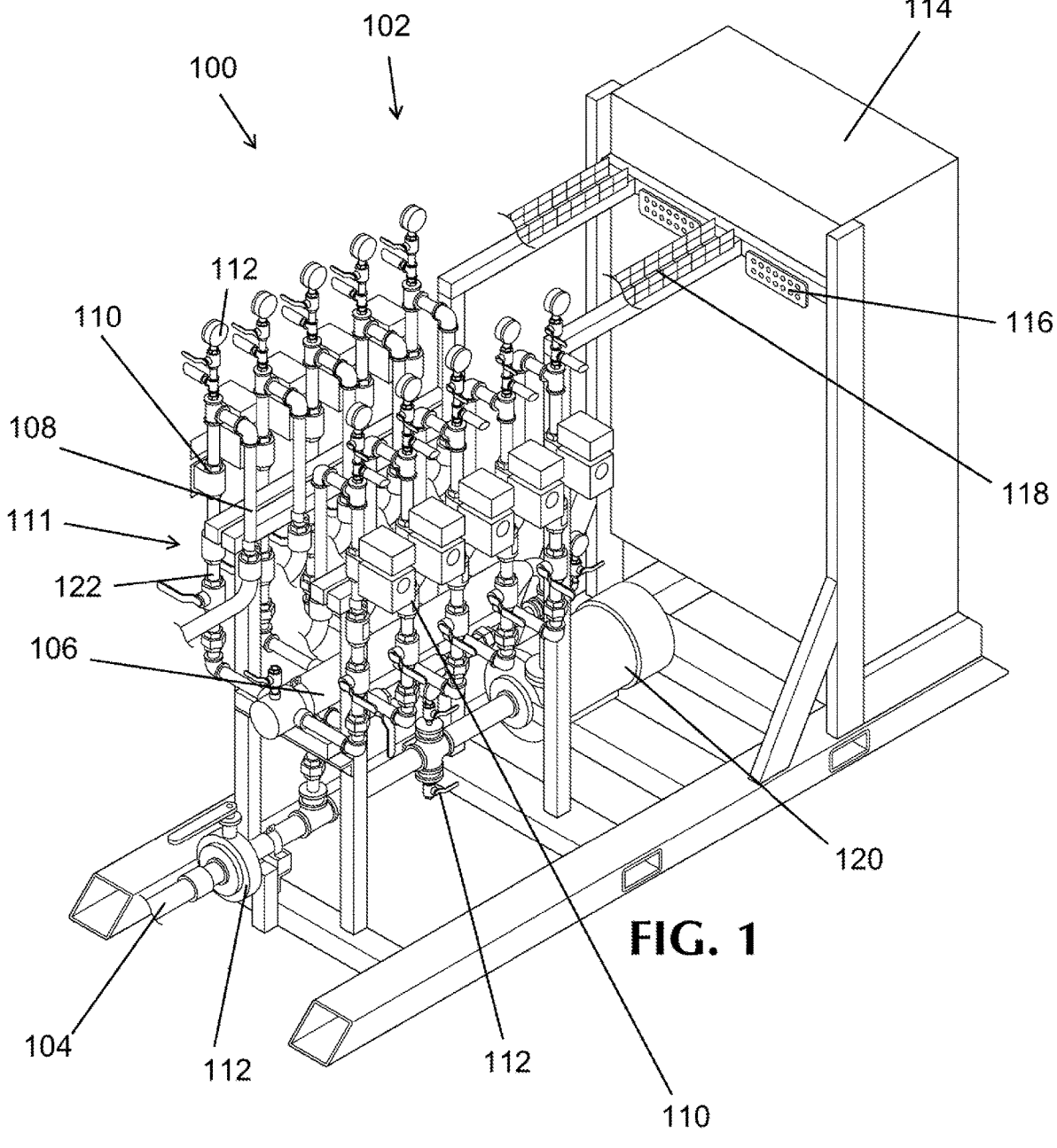
FIG. 1 depicts a perspective view of an injection system in accordance with an embodiment of the invention.

The invention herein comprises systems, devices, and methods that automate and improve on conventional methods related to the injection of liquid amendments into contaminated sites by controlling injection pressures and flow rates based on design parameters to either induce or minimize fracturing. This is a new technology for the injection industry supporting in situ remediation through automated, adjustable systems over current use of manually controlling flow rates and pressures that rely on a variety of mechanisms including, but not limited to, ball valves, pump speed, and pressure gauges and digital turbine flow meters. The present invention is capable of being configured in a variety of ways and improves on the art by granting users greater control over induction or prevention of fracturing and the ability to know key data and respond rapidly to changes in the site. The present art is limited in its ability to control such fracturing because it is frequently limited in its ability to react to the signs of fracturing, and when it is able to detect the potential for fracturing, may be limited in its ability to modulate fluid injection appropriately to prevent such fracturing.

The present invention resolves many of the issues of the state of the art by utilizing a variety of sensors and, in some examples, the assistance of a computerized device, in addition to other features of the invention, to help prevent the adverse results from occurring. The system, sometimes relying on computer components, is able to intake data from the sensors during fluid injection, and synthesize data at a rate that a human operator is incapable of, and then make adjustments to the injection pressure and flow rate of the injection system to prevent adverse results or make recommendations to an operator regarding injection pressure and/or flow. The system can be pre-configured or otherwise collect data regarding what parameters cause adverse results and then can monitor while the injection of fluids is occurring to reduce the risk of an adverse result occurring by comparing, the parameters known to the parameters being detected by the sensors.

Liquid amendments are key tools in the remediation of chemical and other contamination of soils and other ground media, and the ability to decontaminate groundwater without damaging such media is vital to proper environmental remediation efforts. Amendments can typically be injected and distributed to provide direct contact with the contaminants, thus eliminating them through various means such as chemical reactions, or they can create a biological or chemical treatment zone or barrier in the path of the contaminants, such that the contaminants contact the amendment as they move through the treatment zone or barrier. Each contaminated site has its own geology and hydrogeology, resulting in each site requiring different approaches and having differing concerns. Conventional approaches typically involve manual systems operated. by a human operator, while the present invention utilizes automated, granularly adjustable systems to monitor and react to changes rapidly, ensuring that the amendment process can continue without damage to the environ or loss of efficiency due to issues such as fracturing of target sites. Fracturing, in the industry, refers to a measure of how well the media's particles adhere to each other, with various compositions and materials possessing different cohesive strengths. Once the cohesive strength is overcome due to pressure, a fracture is created. Fracturing can reduce the effectiveness of the amendment by resulting in less contact with the contaminant, and in some cases can result in the amendment mixture leaving the intended zone and rising to the surface. Fracturing, as described, can result in the amendment taking new flow paths out of the targeted. injection zone and away from the contaminants.

The present invention thither enables an operator to inject fluids into target areas at specified sites to optimize the distribution and contact with contaminant substances with a high level of precision. The present invention allows for automated, granularly adjustable control of injection pressures and .flow rates based on a variety of factors including, but not limited to, pressure, ground water elevation based on head pressure, groundwater mounding, groundwater temperature, groundwater pH, groundwater oxidation reduction potential (CORP), groundwater dissolved oxygen (DO), groundwater total dissolved solids (IDS), and groundwater resistivity. These, however, are not the only factors that may be evaluated, and the system may also take into account other factors including, but not limited to, the composition of the fluid being injected, media temperature, media composition, and other factors that may impact fracturing. The system. may also be calibrated with information based on the geology and hydrogeology of the site, allowing for a more customized approach to treatment of said. site. Furthermore, various embodiments of this invention may allow automated modification of other characteristics of the amendments, controlling not just the injection pressure and flow rate, but also factors including, but not limited to, temperature of the amendment or other components, or concentration of components in the fluid.

The present invention innovates over the art in a variety of ways, including, but not limited to, the incorporation of an automation component that eliminates operator error and thus the inadvertent fracturing of target formations that require distribution under fracture pressures. By utilizing automated controls and controls that are capable of more sensitive and rapid adjustment compared to an operator, the system can mitigate the likelihood of adverse results such as fracturing. The present invention system may also be able to provide data reporting to a centralized computer system, where data can be reported and results archived, rather than requiring manual recordation of field data. Thus, the disclosed invention is able to record data at much higher frequencies, which can be useful to practitioners or the art of environmental remediation as a means of assessing various factors, such as the overall effectiveness of the remediation approach. in the present state of the art. many remediation failures result from the lack of effective distribution of the chemical amendments intended to facilitate the remediation, often due to issues associated with the manual operation of injection procedures which cannot respond to certain circumstances effectively.

The automated technology disclosed in the present invention will assist with. supporting the injection of liquid, gaseous, and liquid-like solid colloidal and other amendments into target areas, allowing for optimized distribution and contact with the contaminant materials due to the precision that automated systems are able to achieve. Precise control of injection pressure and flow rate allows for significant improvements in efficiency over those achieved by human operators. Such improvements will potentially allow for faster remediation, improved efficacy of amendments, and reduced impact on the geology and hydrogeology of the impacted site. Precise control of the flow rate and pressure helps to ensure amendments reach all areas of contamination and have an appropriate amount of time to interact with the contaminants and otherwise meet alt the requirements to perform their function.

Conventional control of the system is achieved by an operator utilizing manual control of flow rates and pressures through ball valves, pump speeds, analog pressure gauges and digital turbine flow meters. In the disclosed invention, these tools may be included or may be entirely or partially replaced by systems controlled by digital or electronic systems capable of assisting with making small adjustments to injection pressure and/or flow. When functioning, the automated system receives data from a variety of sensors which measure a variety of factors about the current site including, but not limited to, pressure, ground water levels, based on head pressure, groundwater mounding, groundwater temperature, groundwater pH, groundwater oxidation reduction potential (ORP), groundwater dissolved oxygen (DO), groundwater total dissolved solids (IDS), and groundwater resistivity. The system can then process this incoming data and modify the factors in its control based on such data. In some embodiments, the system is pre-programmed with certain responses to various factors and/or be designed to attempt to reach certain user-defined set points, typically, but not necessarily, less than a calculated fracture pressure, while in other embodiments it may learn over time using approaches such as machine learning to better react to a specific site's characteristics, and the system may take that data and apply it to other sites. In other embodiments, the system may request instruction. from a human operator who may make determinations based on the current state of the data, with the system able to make minute changes to the factors in its control based on operator requirements. In some embodiments the system may have a hybrid approach, which may consist of an automated operation that a human operator can override.

According to some embodiments of the invention, the sensors may collect pressure data using an in-line digital pressure transducer or transducers that continuously collect injection pressure readings and continuously send the information collected to the computer processor. The computer processor may then be configured to simultaneously compare the pressure data taken by the sensors to one or more pressure set points configured by the injection operator which may have been done before the remediation began or may be performed or altered at any time during the remediation. If, in such configurations, the computer notices that one of the one or more set points has been exceeded, then the computer can immediately send instructions to the automated injection flow control system to start to close off the injection of the flow at a defined. rate set by the operator or system, or may shut down flow immediately, both of which can reduce the injection pressure. The injection system, may utilize a variety of control valves, including, but not limited to, gate valves, ball valves, v-port ball valves, butterfly valves, globe valves, needle valves, and check valves, as well as other varieties of valves, include, but not limited to, the use of a combination of the foregoing either in parallel or in series, to either steadily reduce pressure or stop it completely if necessary. In some embodiments, the computer system may be programmed with multiple set points that may function as warning or caution set points, thus not triggering a response from the system to reduce pressure but may be configured to alert an operator, or may involve the computer instructing the injection system to reduce pressure a small degree. For example, as the pressure begins to approach a high-level shutdown set point, wherein the pressure exceeds a set point such that it requires the system be shut down to avoid an adverse result, the computer may instead reduce flow from the injection system to minimize or try to prevent the shutdown condition.

Depending on the embodiment, some of the sensors may be configured to collect a variety of different data types related to the flow of fluid through the system including, but not limited to, mechanical Coriolis, electromagnetic, magnetic, multiphase, ultrasonic, vortex, and turbine digital outputs, and send the data collected to the computer processor for processing. Like pressure data, the flow data may be modulated by opening or closing one or more injection. flow control valves which may be of a variety of types similar to those used for the pressure control. Similarly, to the pressure control, the flow control may have configured set points which can be configured in the same or similar manner to the pressure control. In that regard, the computer can monitor for flow set points. The set points for pressure and flow do not necessarily have to be set at points associated with fracturing, and instead could additionally or alternatively be set to points were the distribution and contaminants are maximized based off a variety of conditions related to the geologic and hydrogeologic conditions at the remediation site.

Other data, as described above, can be collected in the field, such as, but not limited to, the temperature of groundwater or the remediation site, or other factors disclosed herein, and can be sent to the control system to be compared to set points similar to the pressure and flow data. Some embodiments of the invention may have set points for other parameters besides pressure and flow, such as fluid or site temperature, or may have a combination of set points for several parameters. Some, as mentioned, may have multiple set points for a single parameter, or multiple set points for a combination of parameters.

Embodiments of the present invention may be comprised of a variety of systems, hut can include, but are not limited to, a computer system to manage the automation, a variety of sensors capable of detecting a variety of characteristics of the device, and the mechanical equipment that pumps the amendment into the soil. The latter equipment may be comprised of a variety of pumps, valves, tanks, meters, pipes, and other components made from a variety of metals, plastics, composites, and other appropriate materials depending on the needs of the invention.

The sensors, depending on the embodiment of the invention, may be configured to take readings at a variety of rates, such as, for example, 1 hertz, but in other embodiments readings may be taken more or less frequently, depending on a variety of factors. fear example, some embodiments may involve extremely slow injection flow rate or very low injection pressure and thus the risk of adverse result may, though is not necessarily, reduced and in such a situation the sensors may be configured to take readings less frequently, such as once per minute or 0.016 hertz. Alternatively, in a situation in which the risk of an adverse result is high and or the adverse result set paints could be crossed quickly, the sensors may take readings at a higher frequency, such as, but not limited to, 100 hertz. In. any ease, the system may be configured to process the readings from the sensors into a form the system or an operator can utilize, such as, but not limited to, a graphical or numerical output.

In some embodiments of the invention the system is comprised of an injection control unit which is configured to receive the amendment in fluid form from a container thereof and distribute the fluidic amendment to one or more injection locations through corresponding injectors. In some embodiments, the system has sensors located on each of the one or more injectors that are fed fluidic amendment and those sensors are capable of taking data on a variety of factors including, but not limited to fluid pressure at the at least one injection point; fluid flow rates at the at least one injection point; mounding of fluids in at least one of the one or more target areas; temperature of fluids located inside the one or more target areas; oxidation reduction potential inside the one or more target areas; pH inside the one or more target areas; total dissolved solids inside the one or more target areas; and electrical resistivity inside the one or more target areas. The sensors feed information to a control system on the injection control unit where the system or an operator is able to modulate the injection pressure and flow rate of the one or more injectors depending on the readings from the sensors on each of the injectors. Aided by the system, the operator is, in some embodiments, able to make determinations about how to proceed in real time and react to situations that would be impossible for a manual or mechanical operator to properly react to using more conventional control mechanisms. Treatment of some sites may also involve recording or otherwise obtaining other data related to the remediation site prior to or during the injection of remediation fluids that is not necessarily included in the previous list, but many involve tracking qualities such as the composition of the site (such as whether it is predominantly soil, clay, sand, rock, gravel, or other compositions), data related to the variation of the composition of the site across the area that is being treated, data related to the depth the contaminant has reached, and potentially data related to the specific contaminant such as, but not limited to, its chemical properties, viscosity, compressibility, or other factors the operator considers applicable. However, in many situations, data related to the target area is unavailable, difficult to obtain, or even impossible to obtain, resulting in the system needing to rely on data that is gathered at the time of injection, and thus the ability to finely monitor and control the injection pressure and injection flow becomes useful as is found in some embodiments of the invention.

The exact injection pressure and flow rate can be customized depending on the needs of the remediation site and other factors, such as the viscosity of the remediation fluid or its fluidic density. The exact flow rate could be relatively slow, such as, but not limited to, half of a liter per minute for certain compositions of remediation site, to relatively fast, such as, but not limited to, twenty or more liters per minute. These ranges however can be quite varied, and the injection system can be configured depending on the needs of the remediation site to have alternative ranges of injection pressure and flow rate. In some situations, the pressure and flow rate may be continuous throughout the treatment process or may be injected at intervals depending on the needs of the embodiment and/or site conditions.

When operating the invention, the computer system may be configured to display a graphical readout of the injection pressure and flow rate, as well as any data gathered from the sensors, to an operator who can provide instructions to the system if necessary. Frequently, in remediation processes that involve injection, the simplified view of the process is that the injection pressure and flow rate should be kept below a certain maximum value, where that maximum value is a function of a variety of factors including, but not limited to, the composition of the area, the depth of the area, the composition of the remediation fluid and contaminant, and the hydraulic permeability of the area. Monitoring the flow rate can prevent fracturing of the target area and short circuiting where the fluid attempts to escape the area by moving up the injection point around the injector or a connecting line. When many of the factors are known, the system can be configured in advance for what the maximum and/or minimum values for the injection pressure and injection flow rate or other parameters are being controlled should be, allowing the system to modulate while operating to ensure that the injection pressure and flow rate stay at values acceptable given the maximum and/or minimum values for the site. In cases where, a maximum and minimum are present, the system can be configured to maintain pressure and flow rate that falls between them.

In some embodiments the system may divide the incoming remediation fluid to a number of injectors, wherein each injector may have sensors attached to monitor the aforementioned conditions of the outgoing fluids. In some embodiments, additional sensors may be driven into the ground at the remediation site or may otherwise be positioned separate from the injectors to be able to collect additional data, potentially in regards to fluid pressure at the at least one injection point; fluid flow rates at the at least one injection point; mounding of fluids in at least one of the one or more target areas; temperature of fluids located inside the one or more target areas; oxidation. reduction potential inside the one or more target areas; pH inside the one or more target areas; total dissolved solids inside the one or more target areas; and electrical resistivity inside the one or more target areas, or in some embodiments these additional sensors may collect data of other types which may include, but are not limited to, seismic information from the local area, fluid flow rates between differing areas, measurements of surface changes, or any other information regarding the remediation location that the operator considers relevant to the remediation process.

As the system operates, the computer processor and sensors will continuously log and record data related to the injection process, which may include, but is not limited to, the injection pressure and injection flow rate. This data, combined with the data gathered from the sensors as described previously, can be computed to make determinations about the status of the remediation site, and can even be visualized in a manner that a human operator is able to understand and respond to. In some cases, where parameters regarding upper and lower limits on the factors being checked by the sensors along with acceptable parameters for the flow rate and injection pressure have been programmed into the computer memory, the computer can monitor the data coming in from the sensors to determine whether fracturing or other adverse results are likely, and in some embodiments may automatically adjust the injection pressure or flow rate to compensate, allowing the treatment process to be at least partially if not fully automated.

The present invention further improves on the art by eliminating instances where operator error can result in fracturing of the media being treated. Using present methods which focus primarily on ball valves and analog controls, operators cannot respond to changes quickly enough to prevent fracturing. By incorporating computerized systems, in some embodiments, and new approaches to controlling flow rate such as, but not limited to, computer-controlled valves and pumps, the system can respond to orders of magnitude faster than a human operator can. The ability of the sensors to gather constant data, in many cases from. multiple injection points, also allows the computer to discover trends in the data that a human operator would be incapable of detecting and alert the operator thereof Such data can also be recorded and utilized in other data sites, allowing operators and organizations to learn from past remediation projects and prevent adverse results in the future. In some embodiments, what is sometimes considered an adverse result may be a preferred result, and situations may occur where fracturing the remediation site or similar results may be preferable. hi such situations, the present invention allows the operator to control the occurrence of such event by alerting them to when it is likely and providing them with the necessary control and information to facilitate the event.

In some embodiments, the injection system is connected to a reservoir or other form of container of a remediation fluid, but in some embodiments, it may receive such fluids from a remote source that is located potentially far away from the remediation site. The system may also be configured to receive incoming fluid from a municipal water main or other source of fluid that also mixes with the remediation agents to create the final remediation agent on-site. In some embodiments, the remediation may be added to fluids, or other agents may be added within the injection system before, at, or after the sensors connect to the fluid injectors. In some embodiments it may be preferable for the remediation agents to be mixed with other fluids after the sensors, or vice versa, depending on the concerns and goals of the embodiment.

The treatment means, typically a remediation fluid, can be comprised of a variety of chemical compounds as well as dissolved solids, gases, or other states of matter which when introduced to the contaminants can have the effect of neutralizing such contaminants. In some cases, the fluidic amendments may also comprise active bacterial or similar biological treatment options wherein the biological treatment similarly neutralizes or consumes the contaminants, while in other embodiments the treatment may be accomplished through chemical means such as, but not limited to, using an activated. carbon or other reagents). While herein the treatment means is referred to as a remediation fluid, it could also be in a variety of other injectable forms including, but not limited to a mixture, a solution, a suspension, an emulsion, a sot, a slurry, a colloidal mixture or a gel. Combinations of two or more forms in the same product or other hybrid forms of product are possible as well, along with delivery means wherein mixtures are formed in various steps. Some embodiments may inject multiple types of remediation fluids, and in some embodiments, they may use multiple types or types meant to combine to treat the contaminant from the same or different injection points.

By way of example, a targeted site may be contaminated with a chlorinated aliphatic hydrocarbon such as tetrachloroethene. In such a situation, using one or more injection points a source of carbon, such as a carbon slurry or similar remediation substance, may be introduced to the area, stimulating microbial activity and reducing the anerobic conditions in which the tetrachloroethene is gradually dechlorinated by the bacteria present in the site. Eventually these bacteria convert the tetrachloroethene into trichloroethene and then into dichloroethane and vinyl chloride, before eventually converting it into ethene.

The system may be, in some embodiments, configured with one or more injectors that separate out the incoming fluid and/or remediation fluids to be distributed to the injection points. As many injection points as needed may be implemented, and thus for example some embodiments may split the incoming fluids eight ways to eight separate injection points, while other embodiments may split the incoming fluids ten ways and shift them to ten separate injection points. In some embodiments the fluid may be split into two (or more) pipelines, but the pipelines may converge on a single injection site or may have multiple pipelines converge on each of a plurality of injection sites.

As a general rule, the hydraulic permeability of an site will be determined by its depth and composition, but other factors may also impact such permeability. The injection pressure and/or injection flow rate, depending on the data available from the sensors and other sources, can in some situations be used to calculate the depth that the injection is occurring at based on known information related to the site's hydraulic permeability, in situations in which the injection point depth is difficult to measure due to interference inside the site. According to some embodiments, the system could calculate the depth based on the injection pressure and flow rate as compared to other data to determine whether the remediation fluid is being applied to the correct. area of the site.

In some embodiments, the system for the automated injection of fluids into one or more target areas comprises: an injection system configured to inject fluidic substances using variable levels of at least one of the injection pressure and injection flow into one or more target areas wherein at least one injection point is positioned at one or more channels to at least one of the one or More target areas and the injection system is configured to couple to the at least one injection point; one or more sensors coupled to the injection system wherein each of the one or more sensors is configured to collect data regarding at least one parameter; a control system comprised of a memory configured to store data wherein the memory is programmed with at least tolerance criteria related to the at least one parameter; and a processor communicably coupled to the memory configured to execute a plurality of functions, the functions comprising: receiving data from the one or more sensors; determining whether there is a high likelihood of adverse results. the one or more target areas based on a comparison of the data from the one or more sensors and the tolerance criteria related to the at least one parameter stored in the computer memory; instructing the injection system to adjust its at least one of injection pressure and injection flow based determinations made from of the data related to the at least one parameter received from the one or more sensors and the tolerance criteria related to the at least one parameter.

According to some embodiments of the invention, the method of automatically controlling the injection of into one or more target sites without fracturing the one or more target sites or surrounding area comprises: inserting one or more injectors into the one or more target sites; coupling an injection system configured to modulate at least one of injection pressure or injection flow based on instructions from a computer processor to the one or more injectors; communicably coupling one or more sensors configured to detect data related to one or more factors that can cause the one or more target sites to fracture to the computer processor and one or more injectors; comparing data from the one or more sensors to data on conditions that can cause: the one or more target sites to fracture to determine if there is a likelihood that the pressure from the one or more injectors will cause the one or more target sites to fracture; adjusting at least one of the injection pressure and injection flow from the one or more injectors on a consistent basis based on the determination of likelihood of fracturing; and repeating the steps of comparing data from the one or more sensors to data on conditions that can cause the one or more target sites to fracture and adjusting the pressure from the one or more injectors until the injection process has concluded.

FIG. 1 depicts a perspective view of an injection system in accordance with an embodiment of the invention. According to some embodiments of the invention, the system 100 may be comprised of an injection system control unit 102, which facilitates pumping of fluids throughout the system, is comprised of at least one fluid input 104 configured to receive fluids from an external source such as a reservoir or container, a separator unit 106 that can separate the flow of fluids into one or more injector lines 108, which the fluid would pass through on its way to a wellhead. The injection system 100 may also have sensors 110 and valves/pumps 112 positioned depending on the needs of the embodiment in a configuration whereby they are able to respectively collect data on the fluid passing through the system 100 and control the injection pressure and/or flow rate of the fluid passing through the system 100. The system 100 is further configured with a control center 114 which may house the control system which may include a computer processor and/or memory, along with a control input usable by an operator to provide instructions to the system 100. The control center 114 may be connected to the sensors 110 and valves/pumps 112 by wires leaving out of a port 116 in the control center 114 and being threaded across a wire catwalk. 118. The system 100 may have an additional injection system pump 120 to push fluids from the fluid input 104 to the separator unit 106. The system may be further comprised of one or more injection towers 111 that are connected to the separator unit 106 which separates the fluid into each injection tower 111, and the injection towers may be comprised of the injection lines 108, one or more sensors 110, one or more valves/pumps 112 and each may be connected to the control center 114. The injection towers 111 separate the incoming fluid into one or more separate injection streams which flow out the pipelines 122 to the remediation injection points. In the depicted FIG. 1 are ten injection towers 111, but the system 100 may have more or less depending, on the needs of the embodiment. The fluid then moves through the system 100 through pipelines 122, which also may connect the other components of the system 100, then out the injection lines 108, to the injection points. Note that in some embodiments, the valves/pumps 112 and the injection system pump 120 may be the same component.

The invention, in some embodiments, may be comprised of multiple injection points that the injection system 100 couples to, one for each injection tower 111, and these injection points may be configured such that the injection system can collect data from them from the sensors 110 independently and/or modulate the injection pressure and injection flow at the two or more injection points independently using its valves/pumps 112.

The system 100 may be configured to inject a number of different treatment means, including, but not limited to, liquids, dissolved solids, suspended solids, gases, other fluidic states, and/or combinations thereof. Depending on the needs of the remediation effort or other use of the invention, and in accordance with some embodiments thereof, some embodiments may be configured such that the treatment means are mixed prior to, at the time of, or after the sensors 110 of the system 100. For example, if the embodiment is configured to utilize a carbon slurry, the embodiment may mix water and carbon from two or more separate reservoirs containing components of the remediation fluid. In some embodiments, the reservoirs and/or pumps attached thereto may assist with the modulation of the injection pressure and/or flow, they may also be configured to modulate the mixture of the components of the remediation fluid upon instruction from an operator or the system 100. For example, if the system 100 detects substantial changes in the target site that would indicate that a remediation fluid, by way of example, an activated carbon, is not making adequate contact with the contaminant in the site, the system 100 may increase the amount of carbon being injected into the site.

Figure 2:
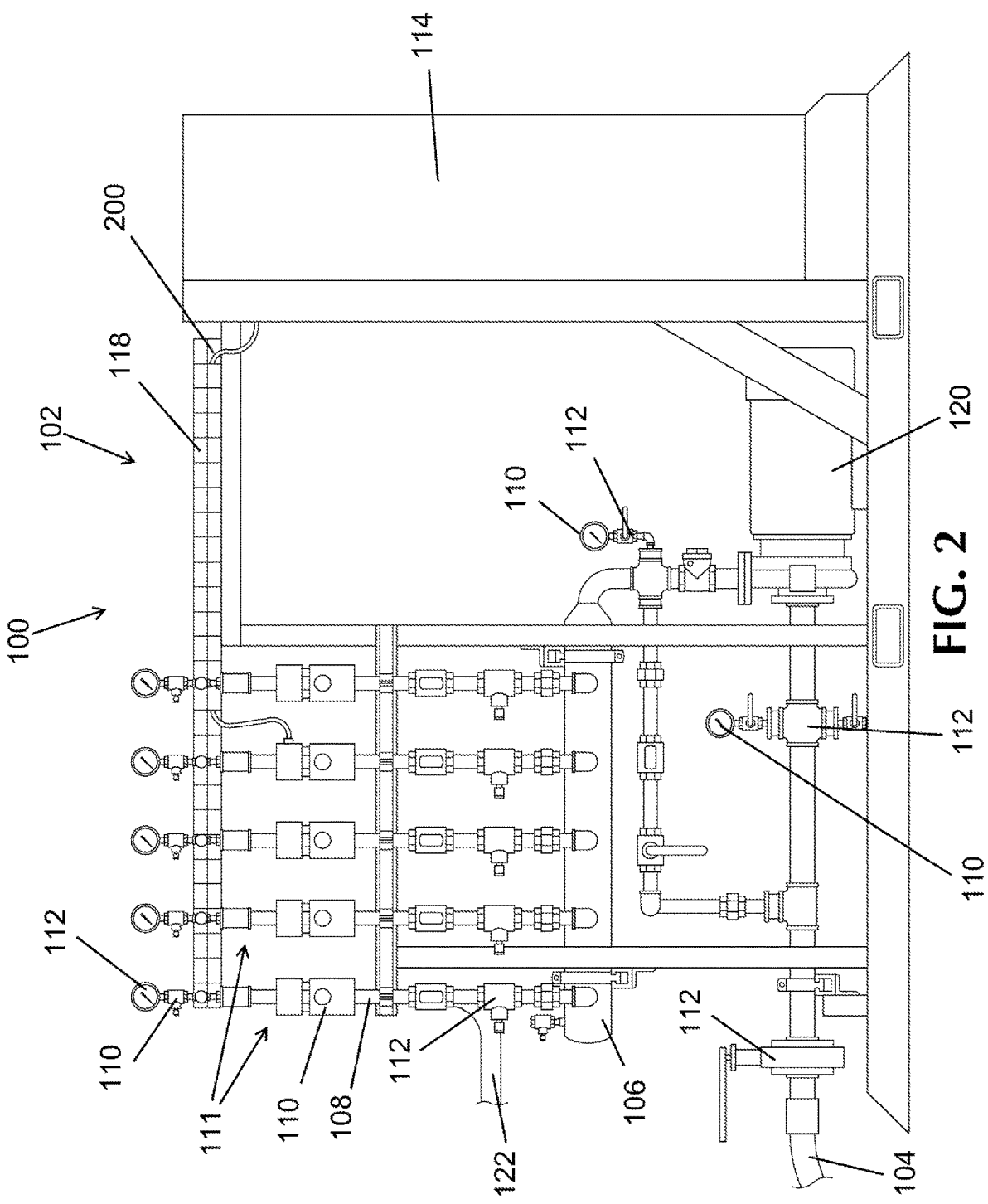
FIG. 2 depicts a side view of an injection system in accordance with an embodiment of the invention.

FIG. 2 depicts a perspective view of an injection system in accordance with an embodiment of the invention. According to some embodiments of the invention, the system 100 may be comprised of an injection system control unit 102, which facilitates pumping of fluids throughout the system, is comprised of at least one fluid input 104 configured to receive fluids from an external source such as a reservoir or container, a separator unit 106 that can separate the flow of fluids into one or more injector lines 108, which the fluid would pass through on its way to a wellhead. The injection system 100 may also have sensors 110 and valves/pumps 112 positioned depending on the needs of the embodiment in a configuration whereby they are able to respectively collect data on the fluid passing through the system 100 and control the injection pressure and/or flow rats of the fluid passing through the system 100. The system 100 is further configured with a control center 114 which may house the control system which may include a computer processor and/or memory, along with a control input usable by an operator to provide instructions to the system 100. The control center 114 may be connected to the sensors 110 and valves/pumps 112 by wires leaving out of a port 116 in the control center 114 and being threaded across a wire catwalk 118. The system 100 may have an additional injection system pump 120 to push fluids from the fluid input 104 to the separator unit 106. The system may be further comprised of one or more injection towers 111 that are connected to the separator unit 106 which separates the fluid into each injection tower 111, and the injection towers may be comprised of the injection lines 108, one or more sensors 110, one or more valves pumps 112 and each may be connected to the control center 114. The injection towers 111 separate the incoming fluid into one or more separate injection streams which flow out the pipelines 122 to the remediation injection points. In the depicted FIG. 2 are ten injection towers 111, but the system 100 may have more or less depending on the needs of the embodiment. The fluid then moves through the system 100 through pipelines 122, which also may connect the other components of the system 100, then out the injection lines 108, to the injection points. Note that in some embodiments, the valves/pumps 112 and the injection system pump 120 may be the same component.

The invention, in some embodiments, may be comprised of multiple injection points that the injection system 100 couples to, and these injection points may be configured such that the injection system can collect data from them from the sensors 110 independently anchor modulate the injection pressure and injection flow at the two or more injection points independently using its valves/pumps 112.

The system 100 may be configured to inject a number of different treatment means, including, hut not limited to, liquids, dissolved solids, suspended solids, gases, other fluidic states, and/or combinations thereof Depending on the needs of the remediation effort or other use of the invention, and in accordance with some embodiments thereof, some embodiments may be configured such that the treatment means are mixed prior to, at the time of, or after the sensors 11.0 of the system 100. For example, if the embodiment is configured to utilize a carbon slurry, the embodiment may mix water and carbon from two or more separate reservoirs containing components of the remediation fluid. In some embodiments, the reservoirs and/or pumps attached thereto may assist with the modulation of the injection pressure and/or flow, they may also be configured to modulate the mixture of the components of the remediation fluid upon instruction from an operator or the system 100. For example, if the system 100 detects substantial changes in the target site that would indicate that a remediation fluid, by way of example, an activated carbon, is not making adequate contact with the contaminant in the site, the system 100 may increase the amount of carbon being injected into the site.

Figure 3:
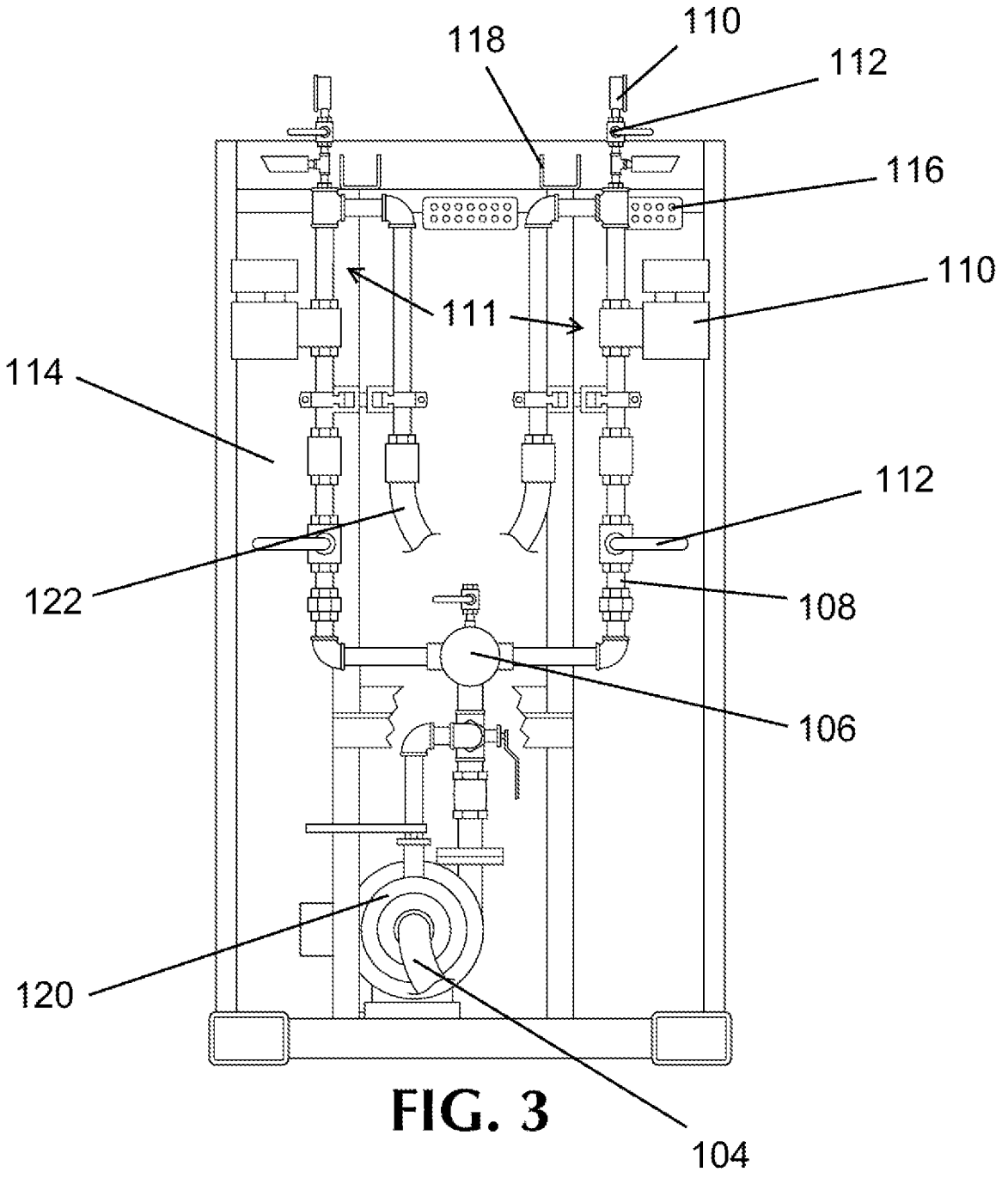
FIG. 3 depicts a front view of an injection system in accordance with an embodiment of the invention.

FIG. 3 depicts a top view of an injection system in accordance with an embodiment of the invention. According to some embodiments of the invention, the system 100 may be comprised of an injection system control unit 102, which facilitates pumping of fluids throughout the system, is comprised of at least one fluid input 104 configured to receive fluids from an external source such as a reservoir or container, a separator unit 106 that can separate the flow of fluids into one or more injector lines 108, which the fluid would pass through on its way to a wellhead. The injection system 100 may also have sensors 110 and valves/pumps 112 positioned depending on the needs of the embodiment in a configuration whereby they are able to respectively collect data on the fluid passing through the system 100 and control the injection pressure and/or flow rate of the fluid passing through the system 100. The system 100 is further configured with a control center 114 which may house the control system which may include a computer processor and/or memory, along with a control input usable by an operator to provide instructions to the system 100. The control center 114 may be connected to the sensors 110 and valves/pumps 112 by wires leaving out of a port 116 in the control center 114 and being threaded across a wire catwalk 118. The system 100 may have an additional injection system pump 120 to push fluids from the fluid input 104 to the separator unit 106. The system may be further comprised of one or more injection towers 111 that are connected to the separator unit 106 which separates the fluid into each injection tower III, and the injection towers may be comprised of the injection lines 10$, one or more sensors 110, one or more valves/pumps 112 and each may be connected to the control center 114. The injection towers 111 separate the incoming fluid into one or more separate injection streams which flow out the pipelines 122 to the remediation injection points. In the depicted FIG. 3 are ten injection towers 111, but the system 100 may have more or less depending on the needs of the embodiment. The fluid then moves through the system 100 through pipelines 122, which also may connect the other components of the system 100, then out the injection lines 108, to the injection points. Note that in some embodiments, the valves/pumps 112 and the injection system pump 120 may be the same component.

The invention, in some embodiments, may be comprised of multiple injection points that the injection system 100 couples to, and these injection points may be configured such that the injection system can collect data from them from the sensors 110 independently and/or modulate the injection pressure and injection flow at the two or more injection points independently using its valves/pumps 112.

The system 100 may be configured to inject a number of different treatment means, including, but not limited to, liquids, dissolved solids, suspended solids, gases. other fluidic states, and/or combinations thereof Depending on the needs of the remediation effort or other use of the invention, and in accordance with some embodiments thereof, some embodiments may be configured such that the treatment means are mixed prior to, at the time of, or after the sensors 110 of the system 100. For example, if the embodiment is configured to utilize a carbon slurry, the embodiment may mix water and carbon from two or more separate reservoirs containing components of the remediation fluid. In some embodiments, the reservoirs and/or pumps attached thereto may assist with the modulation of the injection pressure and/or flow, they may also be configured to modulate the mixture of the components of the remediation fluid upon instruction from an operator or the system 100. For example, if the system 100 detects substantial changes in the target site that would indicate that a remediation fluid, by way of example, an activated carbon, is not making adequate contact with the contaminant in the site, the system 100 may increase the amount of carbon being injected into the site.

Figure 4:
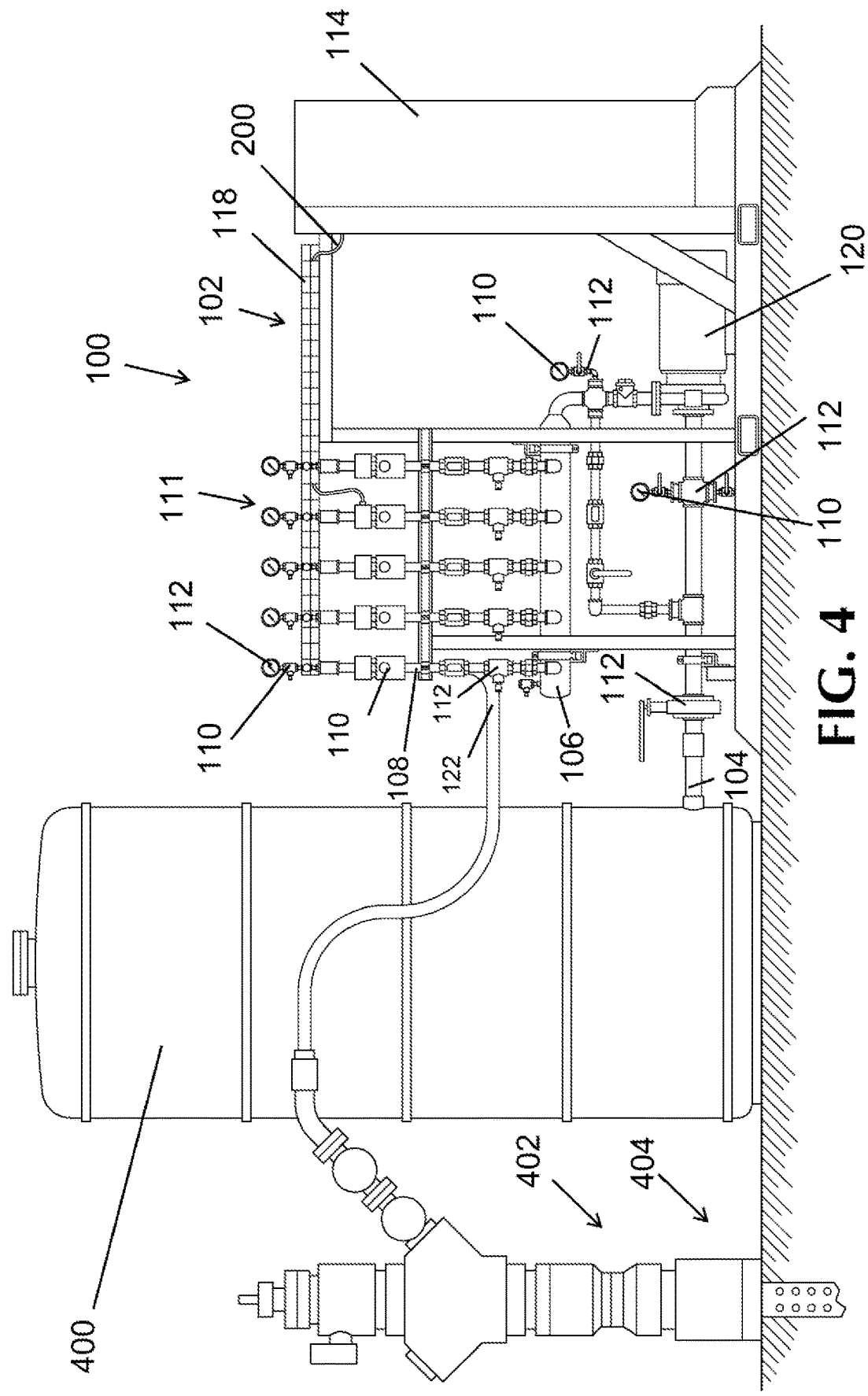
FIG. 4 depicts a scene view of an injection system configured to inject remediation fluids in a target site in accordance with an embodiment of the invention.

FIG. 4 depicts a scene view of an injection system configured to inject remediation fluids in a target site.

The system 100 may be comprised of an injection system control unit 102, which facilitates pumping of fluids throughout the system 100, which is comprised of at least one fluid input 104 configured to receive fluids from an external source such as a reservoir 400 or container, a separator unit 106 that can separate the flow of fluids into one or more injector lines 108, which the fluid would pass through on its way to a wellhead 402 of an injection point 404. The injection system 100 may also have sensors 110 and valves/pm-rips 112 positioned depending on the needs of the embodiment in a configuration whereby they are able to respectively collect data on the fluid passing through the system 100 and control the injection pressure and; flow rate of the fluid passing through the system 100. The system 100 is further configured with a control center 114 which may house the control system which may include a computer processor and/or memory, along with a control input usable by an operator to provide instructions to the system. The control center 114 may be connected to the sensors 110 and valves/pumps 112 by wires 200 leaving out of a port in the control center 114 and being threaded across a wire catwalk 118. The system may have an additional injection system pump 120 to push fluids from the fluid input 104 to the separator unit 106 The system may be further comprised of one or more injection towers 111 that are connected to the separator unit 106 which separates the fluid into each injection tower 111, and the injection towers may be comprised of the injection lines 108, one or more sensors 110, one or more valves/pumps 112 and each may be connected to the control center 114. The injection towers 111 separate the incoming fluid into one or more separate injection streams which flow out the pipelines 122 to the remediation injection points. In the depicted FIG. 4 are ten injection towers 111, but the system 100 may have more or less depending on the needs of the embodiment. The fluid then moves through the system through pipelines 122 to the injection points 404. The injection system 100 may then be connected to one or more injection points 404 into the target site, the area of contamination, and such injection points 404 can be arranged in a variety of configurations.

The invention, in some embodiments, may be comprised of multiple injection points 404 that the injection system 100 couples to, and these injection points 404 may be configured such that the injection system 100 can collect data from them from the sensors 110 independently and/or modulate the injection pressure and injection flow at the two or more injection points 404 independently using its valves/pumps 112.

Figure 5:
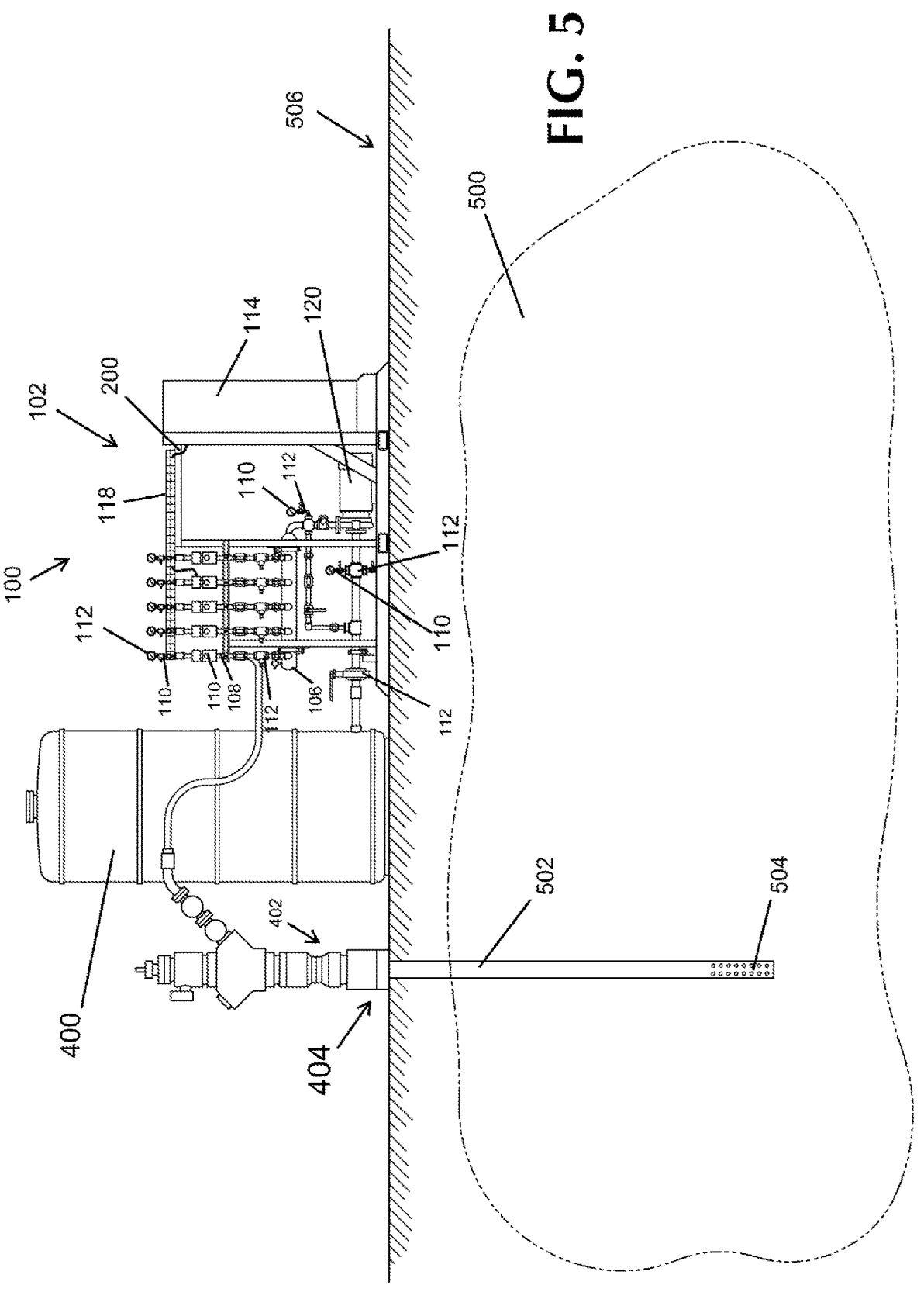
FIG. 5 depicts a scene view of an injection system configured to inject remediation fluids in a target site in accordance with an embodiment of the invention.

FIG. 5 depicts a scene view of an injection system configured to inject remediation fluids in a target site in accordance with an embodiment of the invention.

The system 100 may be comprised of an injection system control unit 102, which facilitates pumping of fluids throughout the system 100, which is comprised of at least one fluid input 104 configured to receive fluids from an external source such as a reservoir 400 or container, a separator unit 106 that can separate the flow of fluids into one or more injector lines 108, which the fluid would pass through on its way to a wellhead 402 of an injection point 404. The injection system 100 may also have sensors 110 and valves/pumps 112 positioned depending on the needs of the embodiment in a configuration whereby they are able to respectively collect data on the fluid passing through the system 100 and control the injection pressure and/or flow rate of the fluid passing through the system 100. The system 100 is further configured with a control center 114 which may house the control system which may include a computer processor and/or memory, along with a control input usable by an operator to provide instructions to the system. The control center 114 may be connected to the sensors 110 and valves/pumps 112 by wires 200 leaving out of a port in the control center 114 and being threaded across a wire catwalk 118. The system may have an additional injection system pump 120 to push fluids from the fluid input 104 to the separator unit 106. The fluid then moves through the system through pipelines 122 to the injection points 404. The injection system 100 may then be connected to one or more injection points 404 into the target site of the remediation site 506, the area of contamination 500, and such injection points 404 can be arranged in a variety of configurations.

The invention, in some embodiments, may be comprised of multiple injection points 404 that the injection system 100 couples to, and these injection points 404 may be configured such that the injection system 100 can collect data from them from the sensors 110 independently and/or modulate the injection pressure and injection flow at the two or more injection points 404 independently using its valve/pumps 112. According to some embodiments of the invention, the injection point may be comprised of a wellhead 402 acting as a cap to a line 502, which may be a pipeline, auger, or other form al link into the area of contamination 500, with a dispenser 504 at the end. Such dispenser 504 may be configured in a variety of ways including, but not limited to; it may be a series of perforations at the end of the line 502 or it may be a separate head that allows for various forms of spray or pressured output of remediation fluids depending on the needs of the remediation site 506.

Figure 6:
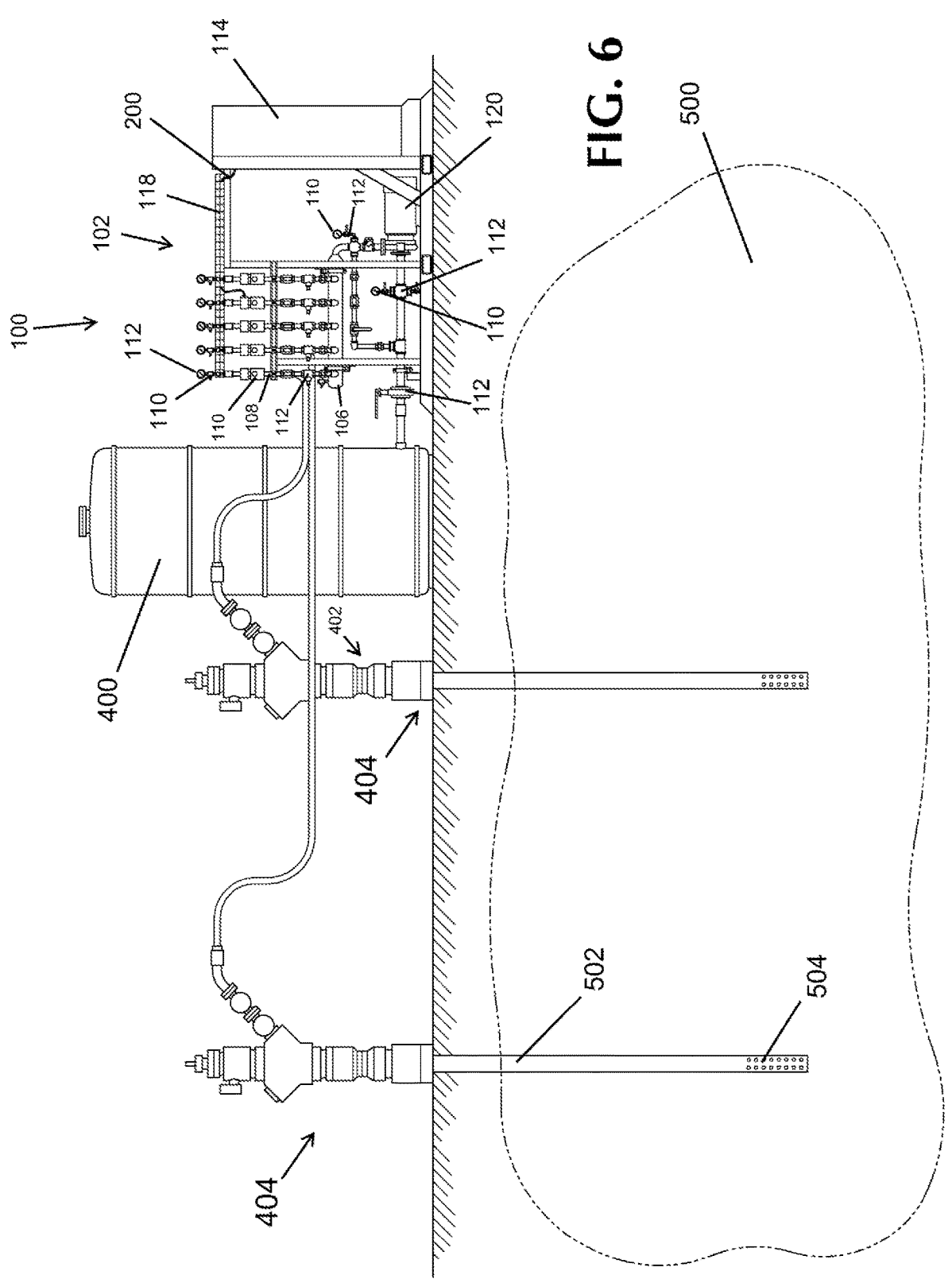
FIG. 6 depicts a scene view of an injection system configured to inject remediation fluids in a target site in accordance with an embodiment of the invention.

FIG. 6 depicts a scene view of an injection system configured to inject remediation fluids in a target site in accordance with an embodiment of the invention.

The system 100 may be comprised of an injection system control unit 102, which facilitates pumping of fluids throughout the system 100, which is comprised of at least one fluid input 104 configured to receive fluids from an external source such as a reservoir 400 or container, a separator unit 106 that can separate the flow of fluids into one or inure injector lines 108, which the fluid would pass through on its way to a wellhead 402 of an injection point 404. The injection system 100 may also have sensors 110 and valves/pumps 112 positioned depending on the needs of the embodiment in a configuration whereby they are able to respectively collect data on the fluid passing through the system 100 and control the injection pressure and./or flow rate of the fluid passing through the system 100. The system 100 is further configured with a control center 114 which may house the control system which may include a computer processor and/or memory, along with a control input usable by an operator to provide instructions to the system. The control center 114 may be connected to the sensors 110 and valves/valves/pumps 112 by wires 200 leaving out of a port in the control center 114 and being threaded across a wire catwalk 118. The system may have an additional it system pump 120 to push fluids from the fluid input 104 to the separator unit 106. The fluid then moves through the system through pipelines 122 to the injection points 404 The injection system 100 may then be connected to one or more injection points 404 into the target site of the remediation site 506, the area of contamination 500, and such injection points 404 can be arranged in a variety of configurations.

The invention, in some embodiments, may be comprised of multiple injection points 404 that the injection system 100 couples to, and these injection points 404 may be configured such that the injection system 100 can collect data from them from the sensors 110 independently and/or modulate the injection pressure and injection flow at the two or more injection points 404 independently using its valve/pumps 112. According to some embodiments of the invention, the injection point may be comprised of a wellhead 402 acting as a cap to a line 502, which may be a pipeline, auger, or other form al link into the area of contamination 500, with a dispenser 504 at the end. Such dispenser 504 may be configured in a variety of ways including, but not limited to; it may be a series of perforations at the end of the line 502 or it may be a separate head that allows for various forms of spray or pressured output of remediation fluids depending on the needs of the remediation site 506.

Figure 7:
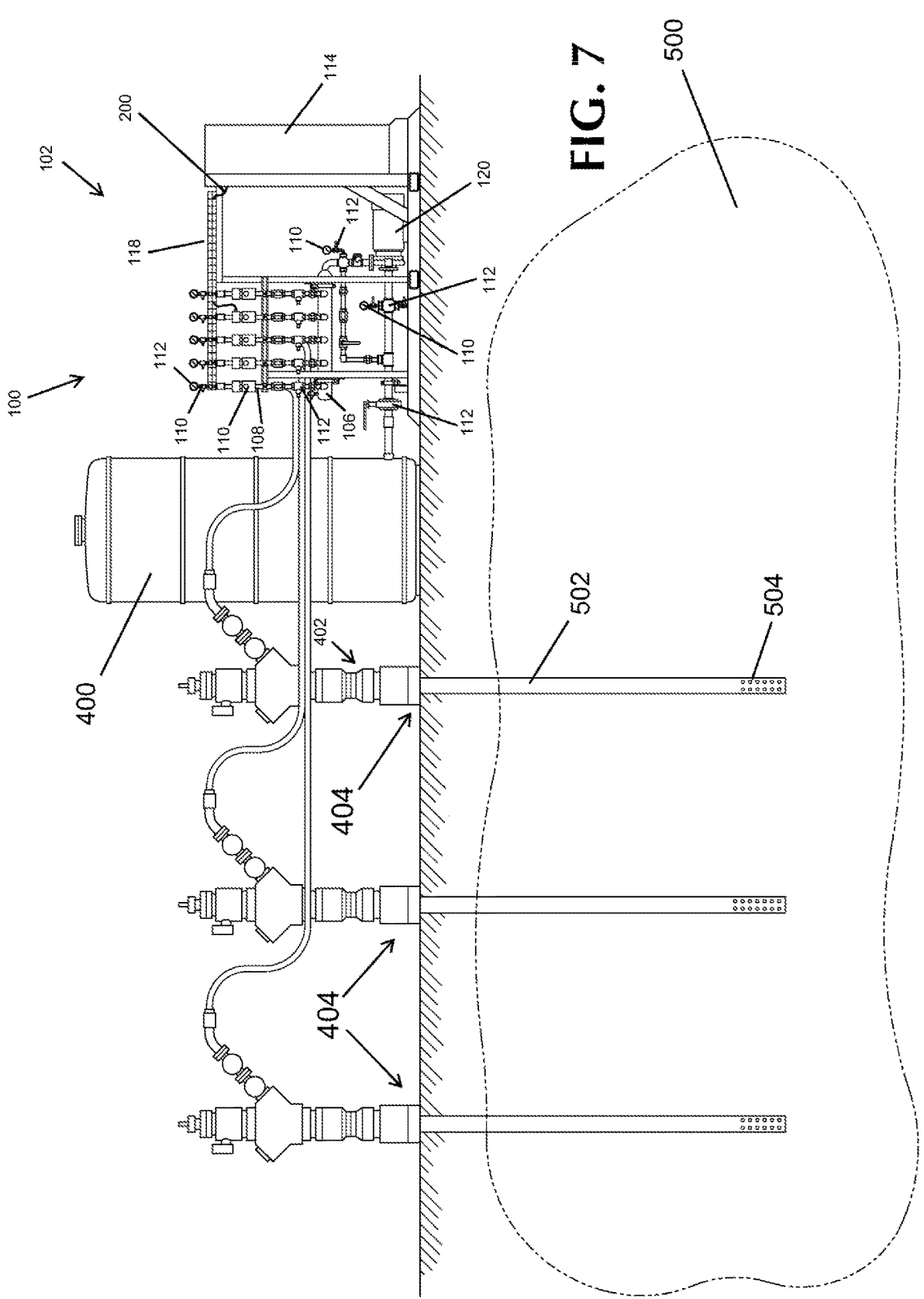
FIG. 7 depicts a scene view of an injection system configured to inject remediation fluids in a target site in accordance with an embodiment of the invention.

FIG. 7 depicts a scene view of an injection system configured to inject remediation fluids in a target site in accordance with an embodiment of the invention. The system 100 may be comprised of an injection system control unit 102, which facilitates pumping of fluids throughout the system 100, which is comprised of at least one fluid input 104 configured to receive fluids from an external source such as a reservoir 400 or container, a separator unit 106 that can separate the flow of fluids into one or more injector lines 108, which the fluid would pass through on its way to wellhead 402 of an injection point 404. The injection system 100 may also have sensors 110 and valves/pumps 112 positioned depending on the needs of the embodiment in a configuration whereby they are able to respectively collect data on the fluid passing through the system 100 and control the injection pressure and/or flow rate of the fluid passing through the system 100. The system 100 is further configured with a control center 114 which may house the control system which may include a computer processor and/or memory, along with a control input usable by an operator to provide instructions to the system. The control center 114 may be connected to the sensors 110 and valves/pumps 112 by wires 200 leaving out of a port in the control center 114 and being threaded across a wire catwalk 118. The system may have an additional injection system pump 120 to push thuds from the fluid input 104 to the separator unit 106. The fluid then moves through the system through pipelines 122 to the injection points 404. The injection system 100 may then be connected to one or more injection points 404 into the target site of the remediation site 506, the area of contamination 500, and such injection points 404 can be arranged in a variety of configurations.

The invention, in some embodiments, may be comprised of multiple injection points 404 that the injection system 100 couples to, and these injection points 404 may be configured such that the injection system 100 can collect data from them from the sensors 110 independently and/or modulate the injection pressure and injection flow at the two or more injection points 404 independently using its valves/pumps 112. According to some embodiments of the invention, the injection point may be comprised of a wellhead 402 acting as a cap to a line 502, which may be a pipeline, auger, or other form al link into the area of contamination 500, with a dispenser 504 at the end. Such dispenser 504 may be configured in a variety of ways including, but not limited to; it may be a series of perforations at the end of the line 502 or it may be a separate head that allows for various forms of spray or pressured output of remediation fluids depending on the needs of the remediation site 506.

Figure 8:
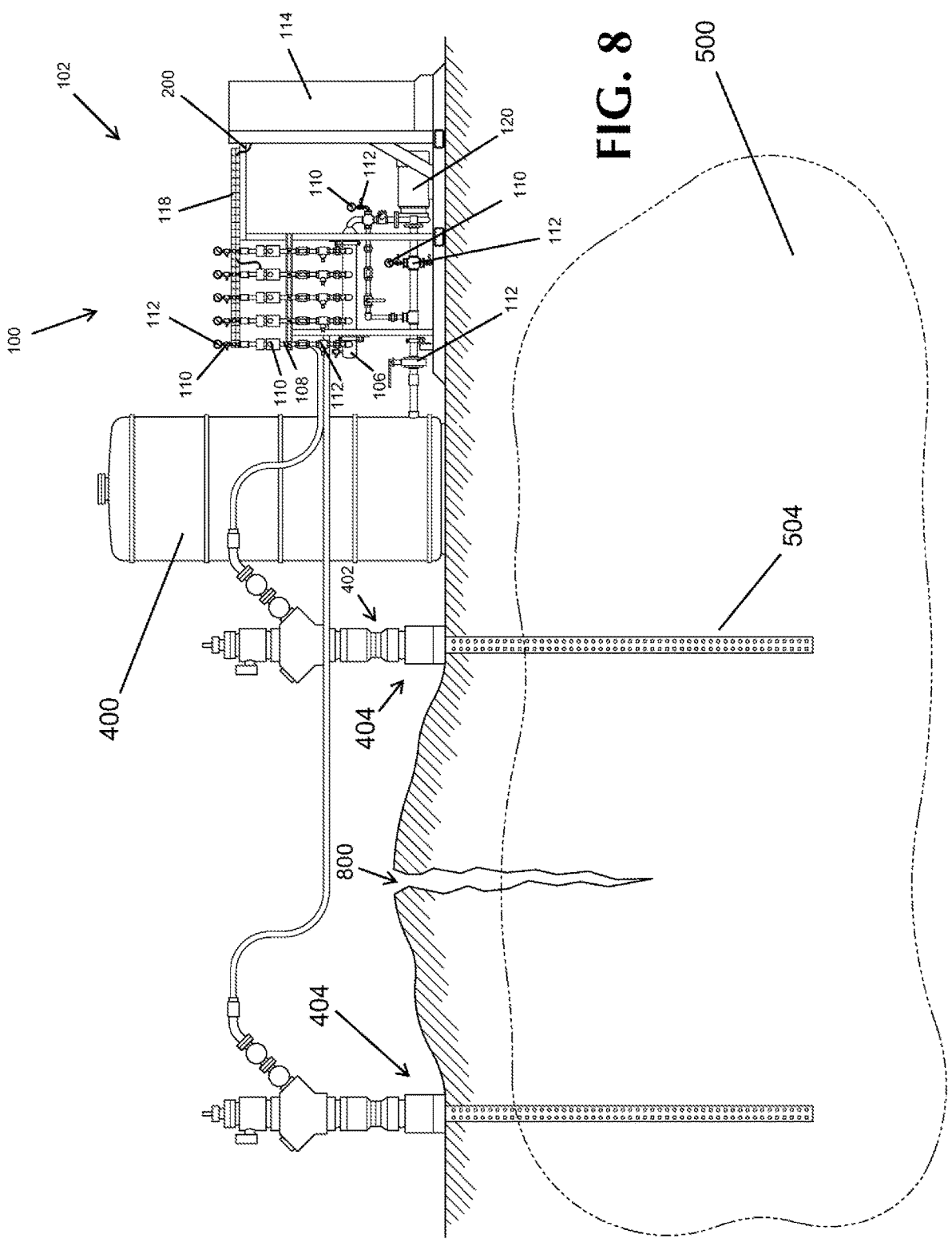
FIG. 8 depicts a scene view of an injection system configured to inject remediation fluids in a target site with a resultant adverse result in accordance with an embodiment of the invention.

FIG. 8 depicts a scene view of an injection system configured to inject remediation fluids in a target site while experiencing an adverse result in accordance with an embodiment of the invention. The system 100 may be comprised of an injection system control unit 102, which facilitates pumping of fluids throughout the system 100, which is comprised of at least one fluid, input 104 configured to receive fluids from an external source such as a reservoir 400 or container, a separator unit 106 that can separate the flow of fluids into one or more injector lines 108, which the fluid would pass through on its way to a wellhead 402 of an injection point 404. The injection system 100 may also have sensors 110 and valves/pumps 112 positioned depending on the needs of the embodiment in a configuration whereby they are able to respectively collect data on the fluid passing through the system 100 and control the injection pressure and/or flow rate of the fluid passing through the system 100. The system 100 is further config- ured with a control center 114 which may house the control system which may include a computer processor and/or memory, along with a control input usable by an operator to provide instructions to the system. The control center 114 may be connected to the sensors 110 and valves/pumps 112 by wires 200 leaving out of a port in the control center 114 and being threaded across a wire catwalk 118. The system may have an additional injection system pump 120 to push fluids from the fluid input 104 to the separator unit 106. The fluid then moves through the system through pipelines 122 to the injection points 404. The injection system 100 may then be connected to one or more injection points 404 into the target site of the remediation site 506, the area of contamination 500, and such injection points 404 can be arranged in a variety of configurations.

The invention, in some embodiments, may be comprised of multiple injection points 404 that the injection system 100 couples to, and these injection points 404 may be configured such that the injection system 100 can collect data from them from the sensors 110 independently and/or modulate the injection pressure and injection flow at the two or more injection points 404 independently using its valve/pumps 112. According to some embodiments of the invention, the injection point may be comprised of a wellhead 402 acting as a cap to a line 502, which may be a pipeline, auger, or other form of link into the area of contamination 500, with a dispenser 504 at the end. Such dispenser 504 may be configured in a variety of ways including, but not limited to; it may be a series of perforations at the end of the line 502 or it may be a separate head that allows for various forms of spray or pressured output of remediation fluids depending on the needs of the remediation site 506. In some embodiments, failure of the system or an operator, such as is common in the state of the art, to mitigate excess injection pressure or flow can result in an adverse result 800 such as fracturing of the surface of the remediation site 506, leakage of remedia- tion fluids or contaminants to the surface, or other such adverse outcomes.

Figure 9:
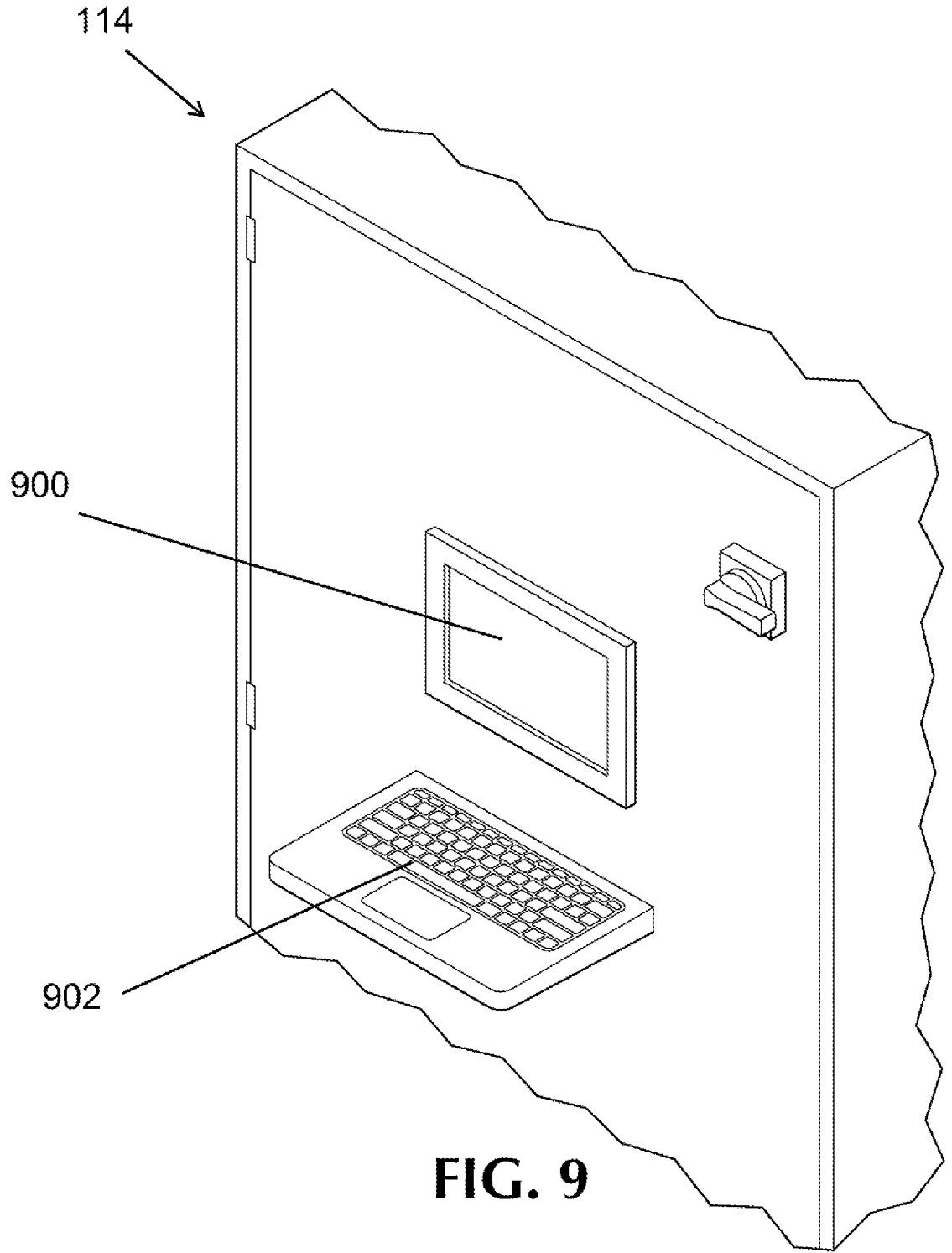
FIG. 9 depicts the user control system of an injection system in accordance with an embodiment of the invention.

FIG. 9 depicts the user control system of an injection system in accordance with an embodiment of the invention. This control system 114 may be attached to the injection system control unit 102 or may be located at a separate place and be communicably linked to the injection system control unit 102. In some embodiments, the system may incorporate an output 900 such as a screen or display, and may have a terminal 902 whereby a user may provide instructions to the computer processor of the system WO to enable such user to monitor the data coming from the sensors and adjust the settings of the valves/pumps 112.

Figure 10:
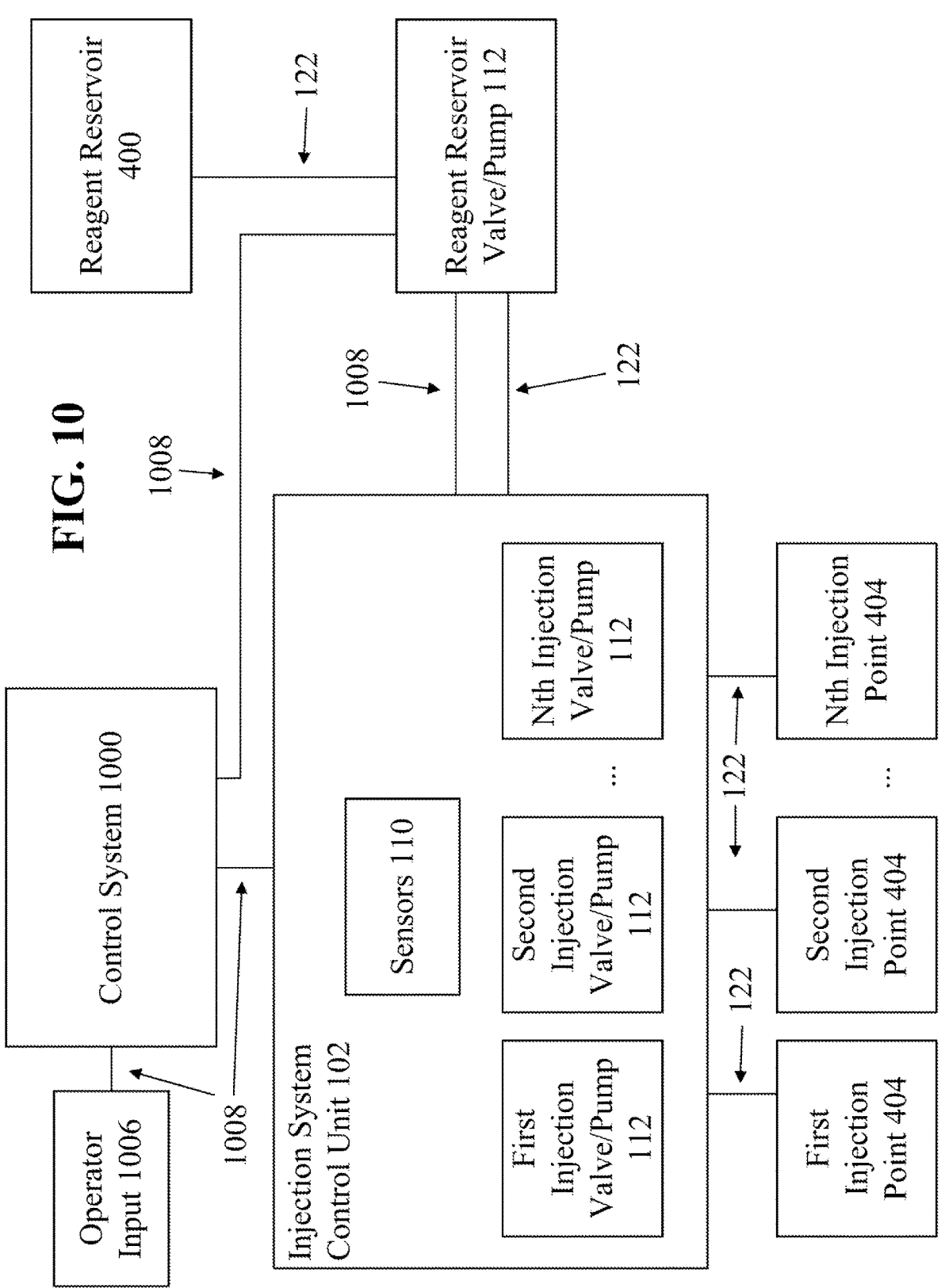
FIG. 10 depicts a system diagram demonstrating the components of the system in accordance with an embodiment of the invention.

FIG. 10 depicts a system diagram demonstrating the system as a whole, in accordance with an embodiment of the invention. The system diagram depicts the relative connec- tions between the various components of the system 100. In some embodiments, the system 100 is comprised of one or more reagent reservoirs 400 connected to a valve/pump 112 functioning as a pumping means to push the remediation fluid out of the reservoir 400 (or tank or container, depend- ing on the embodiment) and further into the system 100. The reservoir 400 may then be connected to the injection system 100 which may be comprised of one or more pipelines 122 and the reservoir 400 may also be connected to the injection system 100 by a pipeline 122, that progress through the system and connect to the one or more injection points 404 which may be a wellhead. The injection system 100 may further be comprised of one or more valves/pumps 112 configured to be able to modulate the injection pressure and/or flow rate of the fluids moving through the injection system 100. In addition, the injection system 100 may be comprised of one or more sensors 110 coupled to the pipelines 122 wherein said sensors 110 are configured to detect attributes related to the fluids moving through the injection system 100 and report the data to the control system 1000. The control system 1000 may be comprised of a memory 1002 and a processor 1004. The control system 1000 may be communicably linked to the one or more sensors such that the one or more sensors can send data collected to the control system 1000 and potentially receive instructions in return, and the control system 1000 may be communicably linked to the one or more pumps of the injection system and/or the pumping means of the one or more reagent tanks, allowing the control system 1000 to receive information from such pumps and pumping means and to send instructions thereto. Some embodiments may also incorporate an output 900 which may be a display, and an operator input 1006 into the control system 1000. The pipelines of the injection system 100 then, as stated previ- ously, connect to the injection points 404 which may extend deep underground and are configured to deliver the reme- diation fluid into the target site through a dispenser the injection points 404 may involve a single outlet for fluids, or may have multiple, and such outlets may have a variety of shapes based on the needs of the remediation site and embodiment. In some embodiments, various components of the system 100, including, but not limited to, the operator input 1006, control system 100, injection system control unit 102, injection points 404, the reagent reservoir 400, and the reagent valve/pump 112 may be communicably linked through connections 1008 which may be in the form of physical wires, wireless connections, or other means of communicably linking such systems. Similarly, some components of the system, according to some embodiments, will be connected by one or more pipelines 122 which may connect the reservoir 400, reservoir valve/pump 112, the injection system control unit 102, and the one or more injection points 404.

According to some embodiments of the invention, the processor 1004 component may be linked to an output 900 that may be configured to perform a variety of functions, including, but not limited to, linking with an external memory storage or other device to transfer data out of the system, display data and other information from the system on a screen or separate device, or connect the system to other embodiments of the system or similar systems. In some embodiments, the system 100 may be further configured to output the data in a human. and/or machine-readable format. Accordingly, some embodiments may also be configured to enable a human operator to directly provide instructions to the processor 1.004 or system 100 itself, and such instructions may include, but are not limited to, altering the injection pressure or flow rate, altering the composition of the treatment means, altering other qualities of the treatment means such as temperature, or any other instructions an operator may need to provide the given embodiment.

In addition, in some embodiments of the system, the processor 1004 may be configured to record a variety of data, including, but not limited to, determinations made by the. system 100 or an operator related to the tolerances of the target site or data related to the occurrence of adverse results (whether intentionally caused or not). This data may be stored on the system 100 or an external. media and may be used by an operator or the system 100 in making determinations about whether to adjust injection pressure or flow rate in response to future sensor readings. The operator or system 100 may further be able, due to configurations of the injection system 100, to review data from each injection point, if there are more than one, independently of the others and instruct the injection system 100 to adjust the injection pressure and flow rate of each injection point 404 independently. The operator or system may also be able to consult historical data stored in the memory 1002, if the embodiment is configured. In such a way, to assist with making determinations as to the likelihood of an adverse result occurring in situations where the operator or system is otherwise nimble to make such a determination.

The sensors 110 may be configured to take data continuously, on a periodic basis, when specifically requested by an operator or the system 100, or in some combination thereof. The sensors 110 may each detect a specific quality or may be comprised of a number of sub-sensors that detect multiple qualities at a time.

Figure 11:
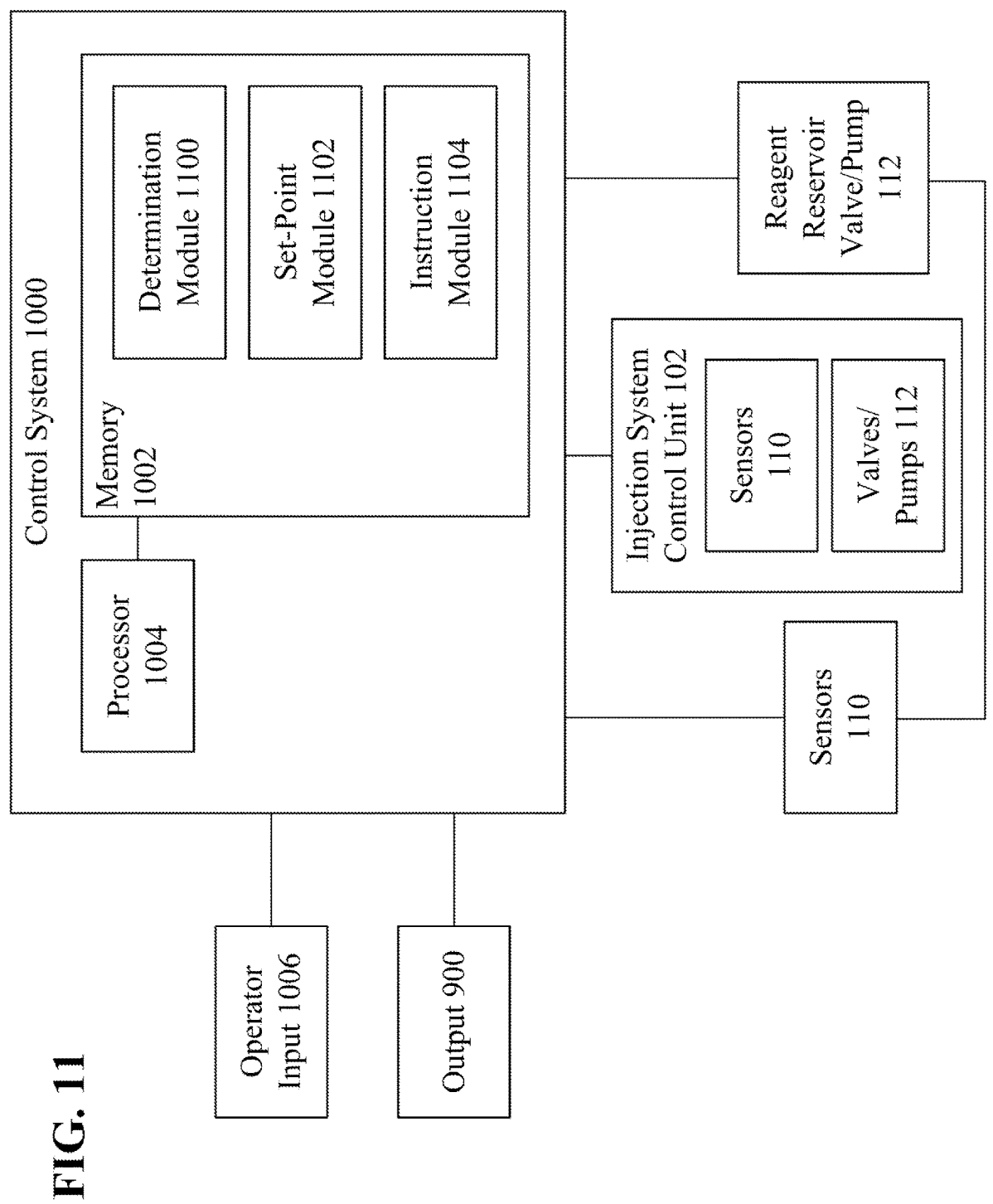
FIG. 11 depicts a system diagram demonstrating the computerized components of the system in accordance with an embodiment of the invention.

FIG. 11 depicts a system diagram demonstrating the computerized components of the system in accordance with an embodiment of the invention. The control system 1000 may be comprised of a memory 1002 and a processor 1004. The processor 1004 may be configured to perform a variety of functions including, but not limited to, making determinations of whether the injection pressure and/or flow rate, as detected. by the sensors, exceeds certain set points determined by the system 100 or an operator which may be stored in the memory 1002. The control system 1000 may be communicably linked to the one or more sensors such that the one or more sensors can send data collected to the control system 1000 and potentially receive instructions in return, and the control system 1000 may be communicably linked to the one or more pumps of the injection system and/or the pumping means of the one or more reagent tanks, allowing the control system 1000 to receive information from such pumps and pumping means and to send instructions thereto. Some embodiments may also incorporate an output 900 in the form of a display and an operator input into the control system 1000.

The system 100 may be configured, in some embodiments, such that the memory 1002 stores certain modules that the processor 1004 is able to access sets of modules to perform certain functions that are stored in said memory 1002. For example, the memory 1002 may be programmed with a determination module 1100 that takes in data from the sensors 110 and compares it to data programmed into a set point module 1102 to determine whether the injection pressure and/or flow rate is going to be exceeded by the current values detected by the sensors 110. The set point module 1102 may be designed such that an operator can use the input 1006 to program set points for injection fluid pressure and/or flow rates as described before, or the input 1006 can be used to request immediate or delayed alteration of the injection fluid pressure and/or flow rate. Depending on the needs of the embodiment, the control system 1000 may then activate an instruction module 1104, which is configured to enable the computer processor 1004 send instructions to the sensors 110, injection system control unit 102, and or the valves/pumps 112. The results of the determination module 1100 may also cause activation of the instruction module 1104 if the processor 1004 using the determination module 1100 determines that the values in the set point module 1102 have been exceeded or the injection pressure and/or flow rate is outside of tolerance levels. In such cases, the system 100 may be configured to have the processor 1004 use the instruction module 1104 to send instructions to other components of the system 100, then out the injection lines 108 100 as described above.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words "comprise", "comprising", and the like are to be construed in an inclusive sense as opposed to an exclusive or exhaustive sense; that is to say, in the sense of "including, hut not limited to". Words using the singular or plural number also include the plural and singular number, respectively. Additionally, the words "herein," "above," and "below" and words of similar import, when used in this application, shall refer to this application as a whole and not to any particular portions of the application.

What is claimed is:

1. A system for automated injection of fluids into one or more target areas to remediate groundwater contamination, the system comprising:

an injection system configured to inject fluidic substances using variable levels of at least one of, injection pressure and injection flow, through the use of a plurality of control valves into one or more target areas of an aquifer wherein at least one injection point is positioned above ground at one or more channels to at least one of one or more target areas, and at least one of the plurality of control valves is connected to the at least one injection point on an individual basis and the injection system is configured to couple to the at least one injection point and wherein said injection system is configured to prevent fluid from moving up the one or more channels;

a plurality of sensors coupled to the injection system and at least one above ground injection point wherein each of the plurality of sensors is configured to collect data regarding at least one parameter related to the one or more target areas of the aquifer;

a control system comprised of a memory configured to store data wherein the memory is programmed with at least one tolerance criteria related to the at least one parameter; and a processor communicably coupled to the memory configured to execute a plurality of functions, the functions comprising:

receiving data from the plurality of sensors;

determining whether there is a high likelihood of adverse results the one or more target areas based on a comparison of the data from the plurality of sensors and the tolerance criteria related to the at least one parameter stored in the computer memory and a comparison to changes in data related to the at least one parameter received from the plurality of sensors representing the response of the aquifer to the injection of the fluidic substances over time;

instructing the injection system to adjust its at least one of injection pressure and injection flow-based determinations made from of the data related to the at least one parameter received from the plurality of sensors and the tolerance criteria related to the at least one parameter, and repeating the process of making determinations based on data from the plurality of sensors on a continuous basis.

2. The system of claim 1, where the at least one parameter is groundwater elevation in the aquifer.

3. The system of claim 1, wherein the processor is communicably linked to an output terminal and is further configured to perform the function of transferring data to an external memory storage medium using the output terminal.

4. The system of claim 3, wherein the processor is further configured to record data related to the determinations made from of the data related to the at least one parameter and the tolerance criteria related to the at least one parameter on the memory.

5. The system of claim 4, wherein the processor is further configured to use data related to the determinations made from of the data related to the at least one parameter and the tolerance criteria related to the at least one parameter on the memory from previous determinations in future determinations.

6. The system of claim 5, wherein the processor is further configured to make determinations based on the data related to the at least one parameter and the tolerance criteria on a continuous basis upon receiving new data from the plurality of sensors, and adjust the at least one of, injection pressure and injection flow, of the injection system and each injection rod according to such determinations.

7. The system of claim 1, wherein the number of injection points is at least two and the injection system is configured to couple with all of the injection points, and the injection points are varied spatially in location with the one or more target areas.

8. The system of claim 7, wherein the plurality of sensors are configured to detect only the parameter at the injection points the sensor is coupled to.

9. The system of claim 8, wherein the injection system is further configured to vary the at least one of injection pressure and injection flow exerted on each of the number of injection points independently based on parameters detected by the plurality of sensors coupled to each injection point.

10. The system of claim 9, wherein the processor is further configured to make determinations on whether there is a high likelihood of adverse results in the one or more target areas based on a comparison of the data from the plurality of sensors and the tolerance criteria related to the at least one parameter stored in the computer memory for each of the number of injection points independently, and further to determine if the parameters detected by one or more of the plurality of sensors attached to one injection point may have a likelihood of adverse results at a target area near one or more of the other injection points.

11. The system of claim 10, wherein the adverse result is the fracturing of any of the one or more target areas.

12. The system of claim 11, wherein the injection system is further configured to increase, decrease, or not change at least one of, injection pressure and injection flow, in response to an instruction from the processor.

13. The system of claim 12, wherein the fluid being injected can be comprised of one or more compositions the injection system is further configured to control the composition of the fluid being injected.

14. The system of claim 1, wherein the fluids injected are chosen from at least one of the list comprising: liquids, dissolved solids, and suspended solids.

15. The system of claim 2, wherein the memory contains sufficient data for the computer processor to make determinations regarding injection flow and injection pressure to avoid exceeding or falling below the tolerances for the fully duration of a remediation cycle.

16. The system of claim 1, wherein the control system is further comprised of an operator input whereby an operator can input instructions to the computer processor.

17. The system of claim 1, wherein the plurality of sensors are configured to only measure one or more parameters of the target area and not measure any parameters of the injection system.

18. The system of claim 1, wherein the system is configured to not require human input once it is initially activated.

19. A method of automatically controlling injection of fluids into one or more target sites of a groundwater aquifer without fracturing the one or more target sites or surrounding area, the method comprising:

inserting a plurality of injectors into the one or more target sites through one or more above ground injection sites wherein said injectors are configured to prevent fluid from moving up an injection well;

coupling an injection system configured to modulate at least one of injection pressure or injection flow based on instructions from a computer processors to the plurality of injectors;

communicably coupling a plurality of sensors configured to detect data related to one or more factors that can cause the one or more target sites to fracture to the computer processor and the plurality of injectors wherein the plurality of sensors are configured to monitor data from the one or more target sites of the groundwater aquifer including, without limitation, the groundwater elevation;

comparing data from the one or more sensors to data on conditions that can cause the one or more target sites to fracture to determine if there is a likelihood that the pressure from the plurality of injectors will cause the one or more target sites to fracture;

adjusting at least one of injection pressure and injection flow from the plurality of injectors on a consistent basis based on the determination of likelihood of fracturing using a plurality of valves wherein at least one of the valves controls either injection pressure or injection flow for only one of the plurality of injectors and there is a corresponding but independent valve for each other of the plurality of injectors; and repeating the steps of comparing data from the one or more sensors to data on conditions that can cause the one or more target sites to fracture and adjusting the pressure from the one or more injectors until the injection process has concluded.

20. A system for automated injection of fluids into one or more target areas for groundwater remediation, the system comprising:

an injection system configured to inject fluidic substances into one or more target areas of an aquifer wherein a plurality of injection points are positioned above ground at an equal number of channels to at least one of the one or more target areas and the injection system is configured to couple to the plurality of injection points wherein said injection system is configured to prevent fluid from moving up an injection well;

one or more sensors coupled to each of the plurality of injection points and the injection system wherein each of the one or more sensors is configured to collect data regarding at least one parameter;

a control system comprised of a memory configured to store data wherein the memory is programmed with at least tolerance criteria related to the at least one parameter; and a processor communicably coupled to the memory configured to execute a plurality of functions, the functions comprising:

receiving data from the one or more sensors;

record data received from the one or more sensors to the memory;

transferring data to an external memory storage medium using the output terminal;

comparing the data from the one or more sensors to changes in data related to the at least one parameter received from the one or more sensors representing the response of the aquifer to the injection of the fluidic substances over time; and reducing the injection flow into the plurality of injection points on an individual basis based on the data from the one or more sensors to prevent fracture of any portion of the one or more target areas and repeating the process of making determinations based on data from the plurality of sensors on a continuous basis.

* * * * *